INVENTOR.
RICHARD T. BURNETT
BY
ATTORNEY

Nov. 7, 1967   R. T. BURNETT   3,351,159
BACKING PLATE, ANCHOR CONSTRUCTION
Original Filed Nov. 8, 1961   7 Sheets-Sheet 2
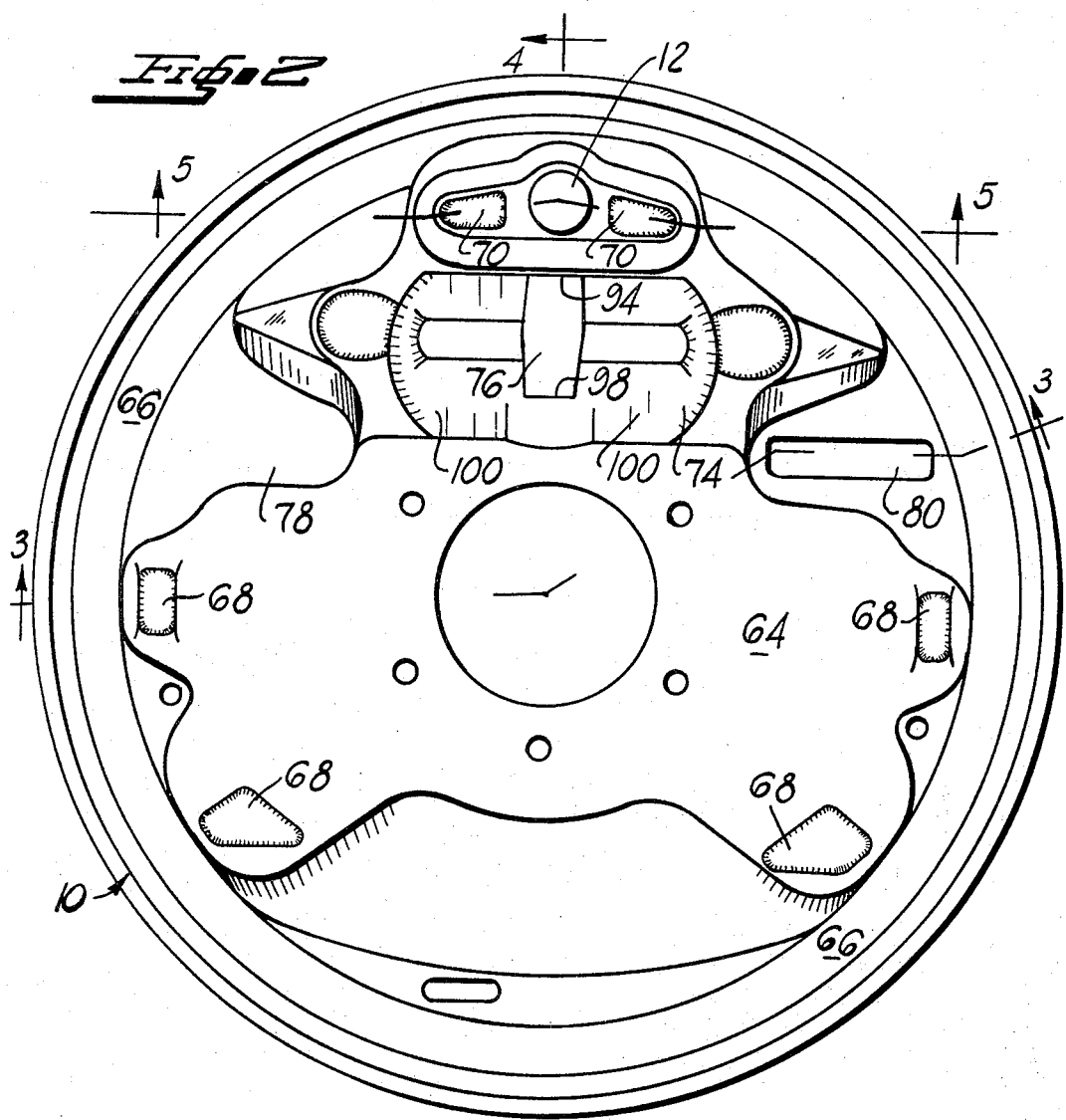
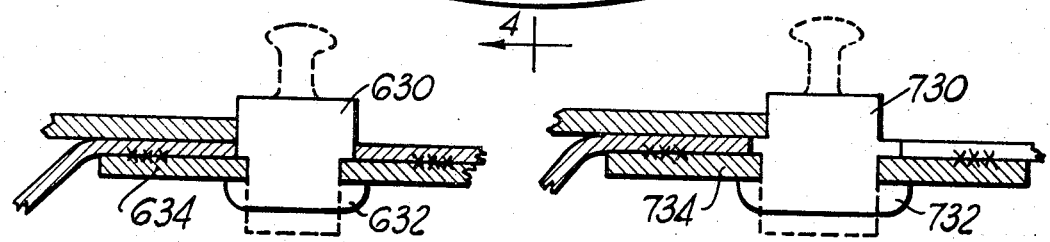
INVENTOR.
RICHARD T. BURNETT
BY
Richard G. Geib
ATTORNEY Nov. 7, 1967 R. T. BURNETT 3,351,159
BACKING PLATE, ANCHOR CONSTRUCTION
Original Filed Nov. 8, 1961 7 Sheets-Sheet 3

INVENTOR.
RICHARD T. BURNETT
BY
*Richard G. Geib*
ATTORNEY

INVENTOR.
RICHARD T. BURNETT
BY
Richard G. Geil
ATTORNEY

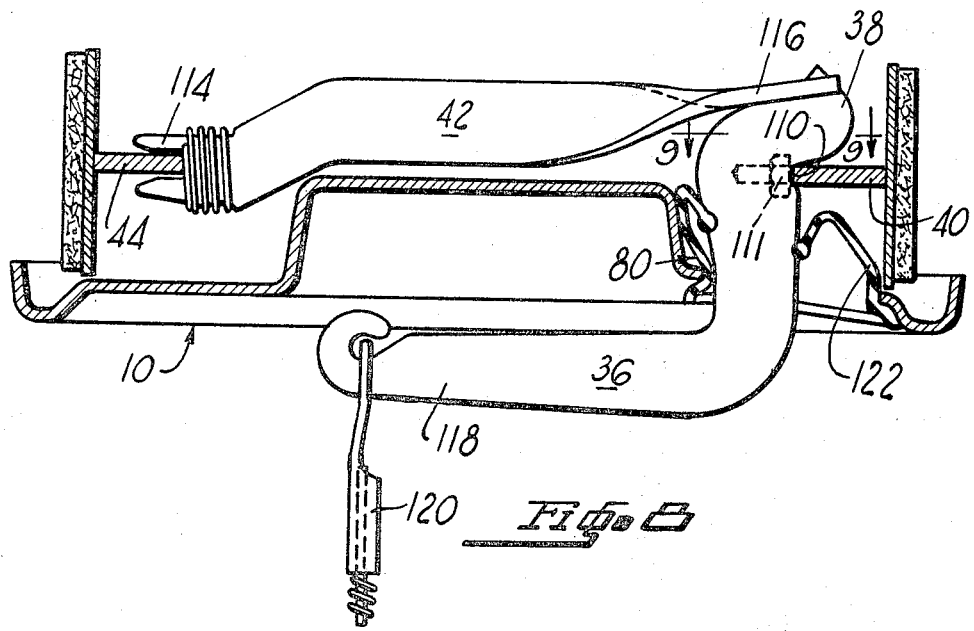
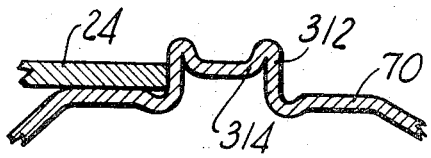
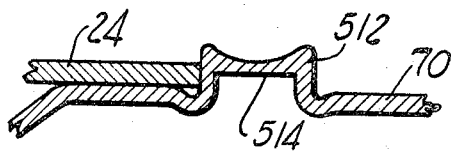
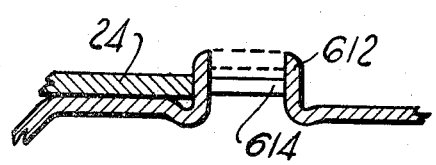

Nov. 7, 1967  R. T. BURNETT  3,351,159
BACKING PLATE, ANCHOR CONSTRUCTION
Original Filed Nov. 8, 1961  7 Sheets-Sheet 6
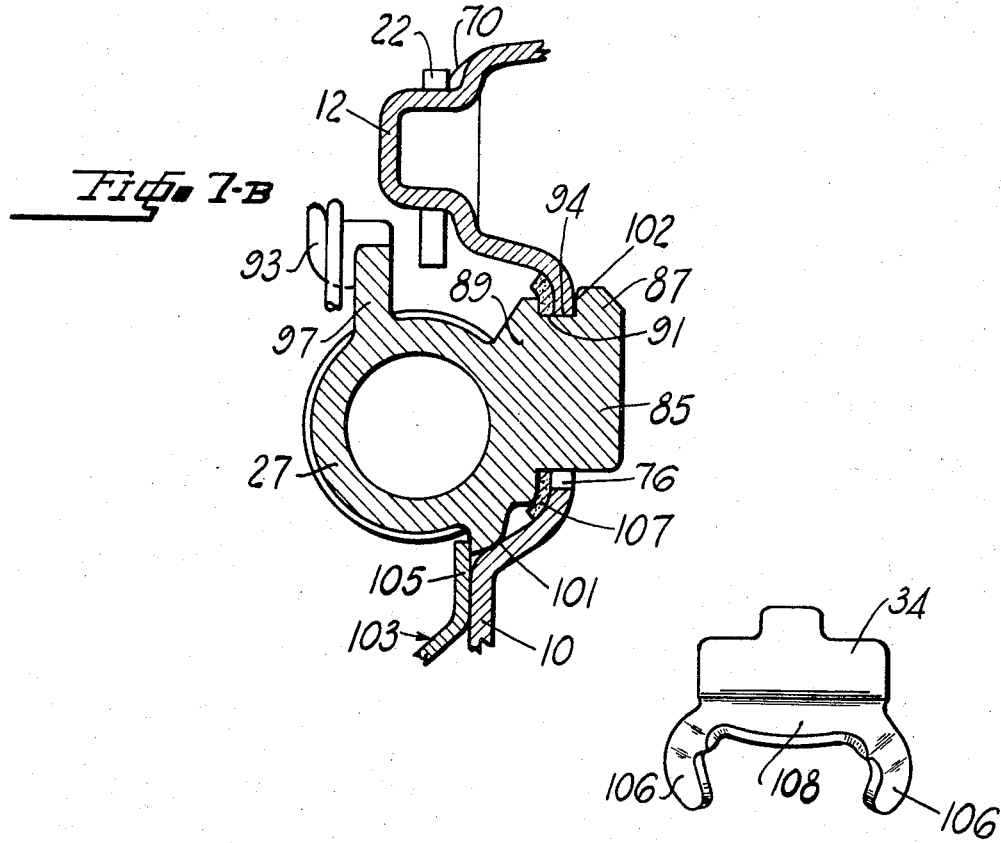
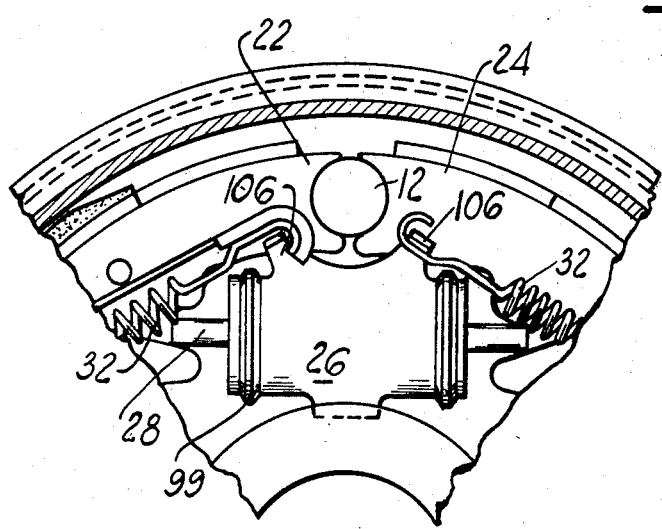
INVENTOR.
RICHARD T. BURNETT
BY
*Richard G. Geib*
ATTORNEY Nov. 7, 1967   R. T. BURNETT   3,351,159
BACKING PLATE, ANCHOR CONSTRUCTION
Original Filed Nov. 8, 1961   7 Sheets-Sheet 7
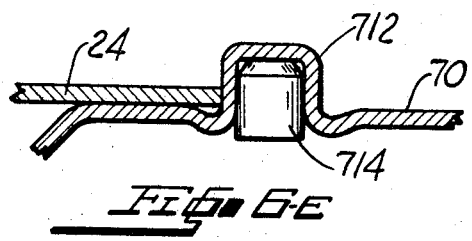
Fig. 6-E
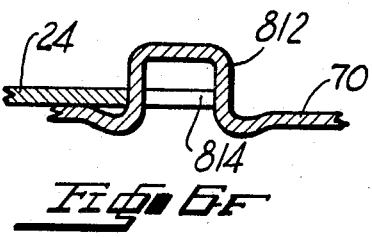
Fig. 6-F
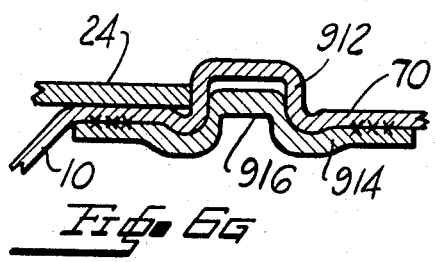
Fig. 6-G
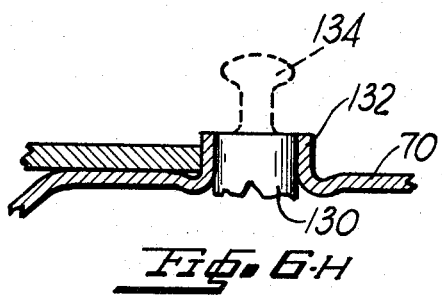
Fig. 6-H
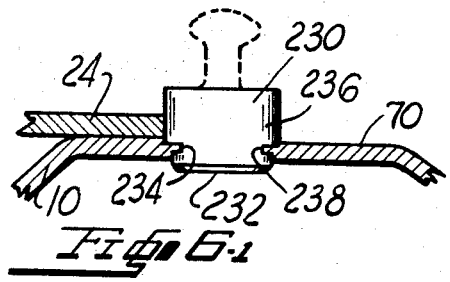
Fig. 6-I
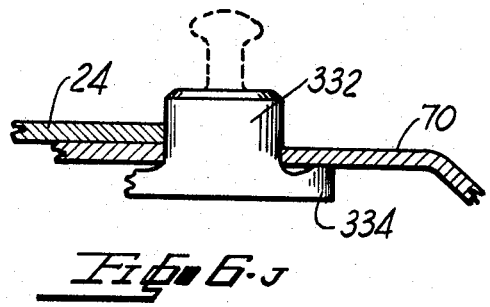
Fig. 6-J
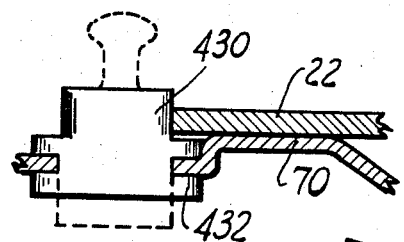
Fig. 6-K
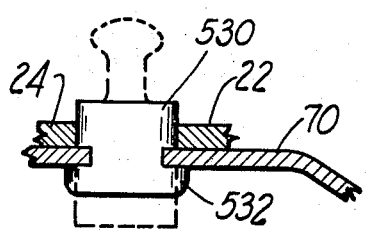
Fig. 6-L
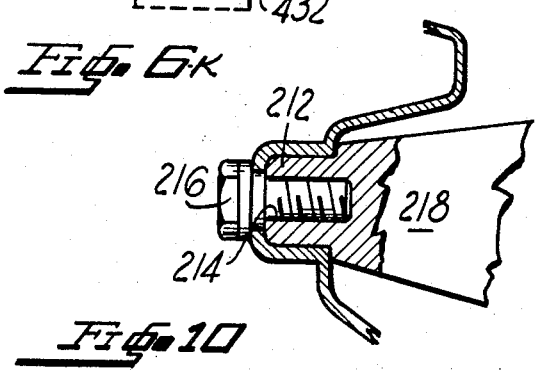
Fig. 10
INVENTOR.
RICHARD T. BURNETT
BY
ATTORNEY

United States Patent Office 3,351,159
Patented Nov. 7, 1967

3,351,159
BACKING PLATE, ANCHOR CONSTRUCTION
Richard T. Burnett, South Bend, Ind., assignor to The
Bendix Corporation, a corporation of Delaware
Original application Nov. 8, 1961, Ser. No. 150,929, now
Patent No. 3,232,391, dated Feb. 1, 1966. Divided and
this application Oct. 22, 1965, Ser. No. 501,486
6 Claims. (Cl. 188—78)

This application is a division of my copending U.S. application Ser. No. 150,929, filed on Nov. 8, 1961, and now U.S. Patent No. 3,232,391.

This invention relates to a backing plate, anchor construction.

The usual brake assembly most commonly employed on present day vehicles requires an anchor pin, an anchor reinforcement plate and a shoe guide plate. The anchor reinforcement plate must be welded to the shoe side of the backing plate and sometimes another anchor reinforcing plate is welded to the back side of the backing plate. Then the anchor pin is inserted through a hole in the reinforcing plate and backing plate and a riveted head is formed on the anchor pin on the back side of the backing plate. These parts and the method of securing the anchor pin and anchor reinforcing plate to the backing plate are unduly costly when compared to the total cost of a brake assembly.

It is an object of the present invention to provide a brake assembly which will be less expensive to produce and still be an improvement over the commonly used brake assemblies of this general type.

Another object of the invention is to provide an improved backing plate which has supporting surfaces for the web of a shoe closely adjacent the anchor.

It is an additional object of the invention to provide an improved one-piece backing plate having supporting surfaces thereon for slidable engagement with the webs of the brake shoes of the brake assembly and also having an integral projection serving as an anchor for the brake shoes.

The above and other objects and features of the invention will appear more fully hereinafter from a consideration of the following description, taken in connection with the accompanying drawings wherein the embodiments of the invention shown therein are illustrated by way of example.

FIGURE 2 is a front view of the backing plate;

FIGURES 6A–6N illustrate different modifications of the anchor;

FIGURE 7A is an isometric view of the locking plate of the wheel cylinder, backing plate connection;

FIGURE 7B is a modification of the wheel cylinder, backing plate connection illustrated in FIGURE 7;

FIGURE 7C is a partial front view of FIGURE 7B;

FIGURE 8 is a section view taken along line 8—8 of FIGURE 1 illustrating the parking brake lever arrangement;

FIGURE 10 is a view similar to FIGURE 7, without the wheel cylinder, which illustrates an embodiment of the invention wherein the backing plate is connected to a spindle at the anchor projection.

Figure 1:
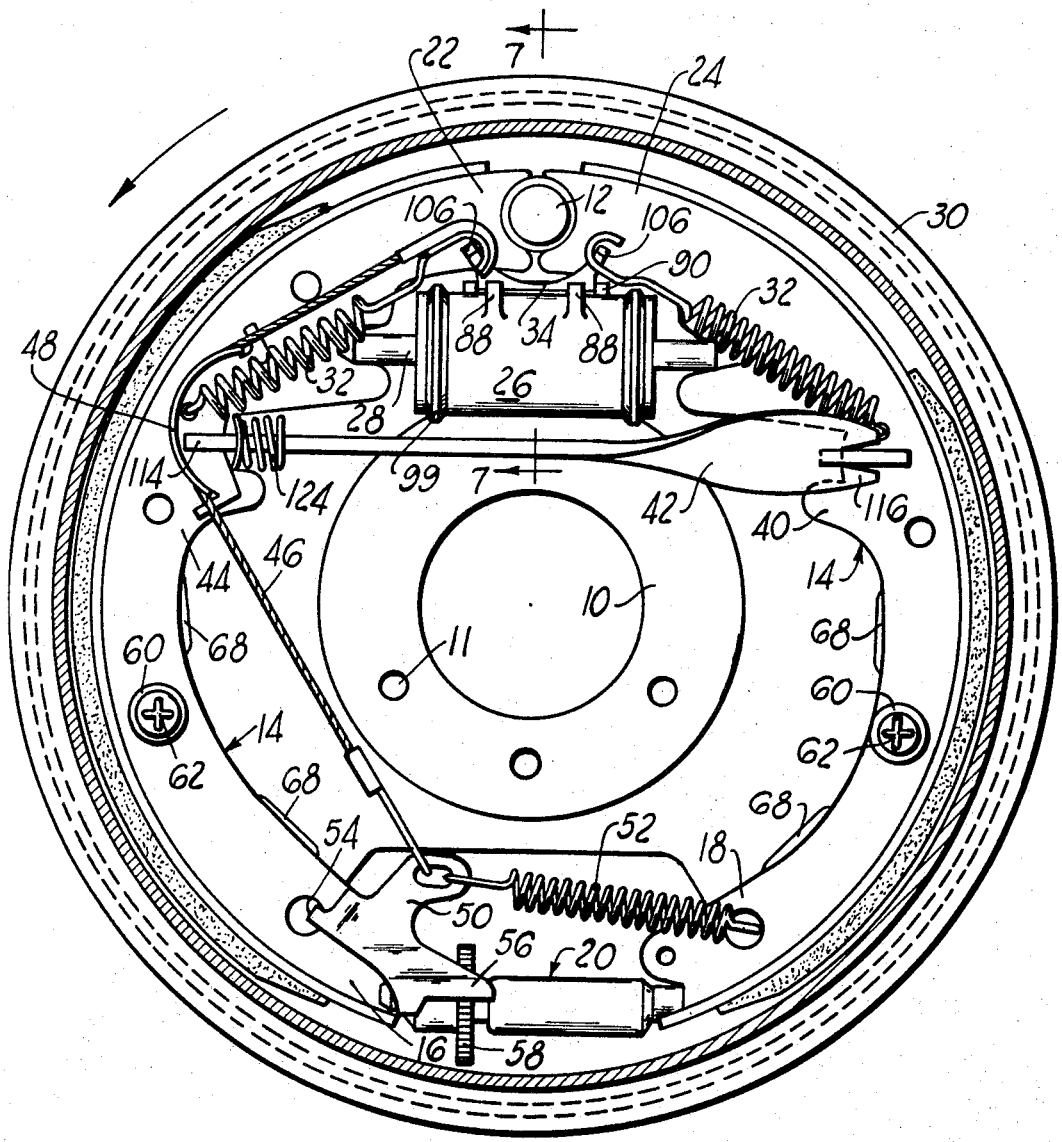
FIGURE 1 is a front view of a brake assembly of the present invention.
Figure 3:
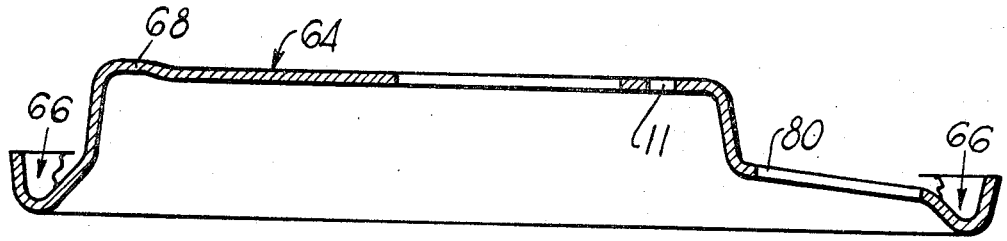
FIGURE 3 is a section view taken on line 3—3 of FIGURE 2.
Figure 4:
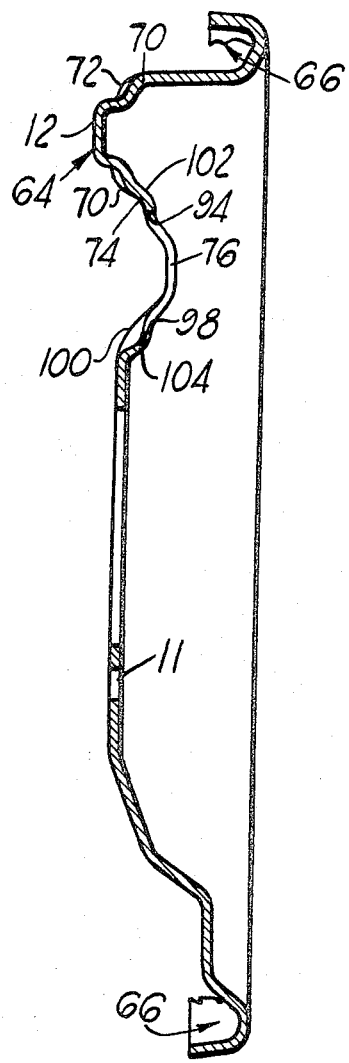
FIGURE 4 is a section view taken along line 4—4 of FIGURE 2.
Figure 5:
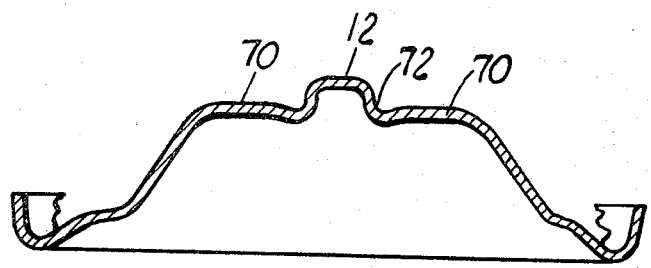
FIGURE 5 is a section view taken along line 5—5 of FIGURE 2.

A preferred embodiment of the brake assembly of the invention is illustrated in FIGURE 1 with the pertinent detailed features being illustrated in the other figures.

With reference to FIGURE 1, the brake comprises a backing plate 10, which constitutes part of the invention having holes 11 receiving bolts to mount the backing plate on an appropriate part of a vehicle such, for example, as the axle flange, not shown. The backing plate has an anchor 12 formed integrally therewith and while illustrated as round, may be of any shape such as, for instance, oval or square. Brake shoes 14 are slidably mounted on the backing plate 10 and have their ends 16 and 18 interconnected by adjusting strut 20. The opposite shoe ends 22 and 24 are spread apart by fluid motor 26 secured to the backing plate by means to be described hereinafter. The fluid motor includes a pair of oppositely acting pistons, not shown, operatively connected to the two ends 22, 24 through force transmitting links 28. Actuation of the pistons applies a force to each of the links tending to move the shoes toward a rotatable drum 30 which may be secured to a wheel, not shown. Springs 32 have one end connected to a locking plate 34 and the other end connected to the respective shoes to urge them into contact with the anchor when the fluid motor is not pressurized. A parking brake lever arrangement, which constitutes part of the invention, is provided which includes a bell crank lever 36 operatively connected to an actuating means, not shown, at one end and has a notched portion at the other end 38 bearing against shoe web 40. The bell crank lever end 38 is further connected to a strut 42 which is connected to shoe web 44. Rotation of the bell crank lever 36 spreads the shoes apart and into contact with the drum 30. The above arrangement also has a conventional automatic adjusting mechanism comprising cable 46 and cable guide 48, lever 50 and spring 52. The cable 46 is attached at one end to the locking plate 34 and has the other end connected to lever 50. The spring 52 has one end connected to the shoe web 40 and the other end connected to the lever 50. The lever 50 is pivotally connected to shoe web 44 at 54 and has a portion 56 engaging the toothed wheel 58. If the brake shoes require a greater distance than desired before contacting the brake drum, the cable 46 will pivot the lever 50 so that the portion 56 will engage another tooth of wheel 58. Upon release of the brake, spring 52 will return lever 50 to its normal position thereby turning toothed wheel 58 through the lever portion 56. Spring 60 is compressed between the end of the pin 62 which is attached to the backing plate and the web of the brake shoes to help maintain the brake shoes in a laterally fixed location with respect to the backing plate 10.

*Backing plate*

With reference to FIGURES 2–6, the construction of the backing plate can be seen in greater detail. The backing plate 10 is stamped out of a flat sheet of metal and has a central area 64 raised relative to the outer periphery 66 of the backing plate. As can be seen, integral anchor 12 extends axially above the central area surface 64. Pads 68 and 70 are slightly raised a distance greater than one-half the width of the brake shoes 14 from the outer periphery 66 and raised to a lesser distance above the central surface 64 and are slidably engaged by the webs 40, 44 of the brake shoes. Pads 70 are closely adjacent the anchor 12, thus supporting the brake shoes closely adjacent the anchor pin. The anchor 12 joins the central portion at neck 72 which is a minimum distance from the plane of force exerted by the web ends 22, 24 of the brake shoes on the anchor when the brake is applied.

Actually, the depression of the neck 72 is below the plane of pads 70 a distance less than the thickness of the backing plate. Therefore only the minimum amount of bending moment is produced upon the anchor and the necessary designed strength of the anchor may be substantially reduced. In a backing plate construction where the ends of the shoes nearest the anchor are not supported in the above manner, said ends tend to pivot toward the backing plate (therefore the web ends are closer to the backing plate than the center portion of the webs of the brake shoe) and slide axially toward the backing plate during the brake application causing a detrimental effect on the anchor and brake shoe besides a dragging effect and slow release. Constructing the pads 70 closely adjacent the anchor allows the brake shoe ends 22, 24 to be located axially to bear at right angles against the anchor when the brake is applied and inherently provides a stronger construction in the area of the anchor 12. Test results have shown that there is substantially less deflection of the backing plate in the anchor area when this construction is used.

FIGURES 6A–6C illustrate the different shapes of integral anchor projections 312, 412 and 512. Only one shoe web is shown for convenience. The primary purpose of these shapes is to provide additional support for the walls of the anchor projections. Preferably, but not necessarily, the rear surface 314, 414, 514 of each anchor is below the edge of the shoe web.

FIGURE 6D illustrates integral anchor projection 612 wherein slug 514 is sheared from its dotted line position to the full line position where it provides better support for the walls of the projection 612.

FIGURES 6E and 6F show chamfered plug 714 inserted into projection 712 and plug 814 inserted into projection 812, respectively. The plugs provide additional support for the walls of the projections.

FIGURE 6G illustrates a reinforcing plate 914 having a front portion 916 thereof inserted into the integral anchor projection 912 and rear portion thereof resistance welded to the backing plate 10.

FIGURE 6H illustrates a plug 130 inserted through the integral anchor projection 132 of the plate. Plug 130 is press fitted into position and may have an end 134 on which springs may be mounted and a shoe guide plate may be mounted if the novel wheel cylinder mounting means of the present invention is not used in conjunction with the brake assembly.

Instead of having an integral anchor projection extending axially above the backing plate central portion 64, an anchor pin may be inserted through a hole and punched in the center portion of the backing plate and welded to the backing plate. FIGURES 6I–6N illustrate this construction in different embodiments. In FIGURE 6I pin 230 has a lower portion 232 inserted through opening 234 of backing plate 10. The flange 236 of pin 230 is forced down against the backing plate 10 and this forces material of the backing plate to flow into the groove 238 of pin 230 thereby creating an interlock between the pin 230 and backing plate 10. FIGURE 6J discloses a pin 330 which has a front portion 332 inserted through the opening in the backing plate 10 and the lower portion 334 is welded to the backing plate. The lower portion 334 is shown prior to welding. The anchor pins 430, 530, 630 and 730 of FIGURES 6K–6N are inserted from the shoe end of the backing plate to the rear of the backing plate with the rear ends of the anchor pins 432, 532, 632 and 732 having the shape as shown in dotted lines. The last named rear ends of the anchor pins have been reshaped as shown in full lines and welded to the backing plate. FIGURES 6M and 6N illustrate the use of a reinforcing plate 634 and 734 in conjunction with the anchor pins 630 and 730. The reinforcing plates 634 and 734 are welded to the backing plate and the anchor pins 630 and 730 are riveted to their respective reinforcing plates. As can be seen by FIGURES 6I–6N, the shoe webs are supported closely adjacent the anchor pins and the anchor pins may be of very short construction and do not withstand as much a bending stress as they would if they were attached to a center portion of a backing plate which is not raised axially the same amount as that contemplated in the invention. The anchor pins 230, 330, 430, 630 and 730 may have axially extending portions at the front thereof for the same purpose as end 134 of plug 130.

A shallow depressed area 74 is formed in the backing plate with a radial slot 76 formed therein. The area 74 is shaped as close as possible to the outer periphery of the wheel cylinder 26 and the back of the area 74 is kept as close as possible to the plane of the central area 64 to add to the strength of the backing plate in the area of the anchor 12. The wheel cylinder or fluid motor 26 fits into the shallow depressed area in a manner to be described hereinafter. The outer periphery of the central portion has recesses 78, one of which has a slot 80 therein depending on whether the backing plate is for a right or left wheel. The slot 80 receives a bell crank lever 36 which is operatively connected to a hand brake or parking brake actuator.

While the backing plate construction as illustrated is adapted for a servo type brake, the backing plate construction may be modified by moving the wheel cylinder depression in the area approximately diametrically opposite the anchor.

*Wheel cylinder connection to backing plate*

For explanation purposes, the following terms, forward, upper, lower, downward, axial, radial, front and rear, are used with a view of the following orientation of the brake assembly: The shoe side of the backing plate is the front or forward part of the assembly; the anchor is located in the upper portion of the backing plate; the axis of the brake drum is considered to define the direction of axial movement; and a direction radial to the axis is considered as a radial direction.

Figure 7:
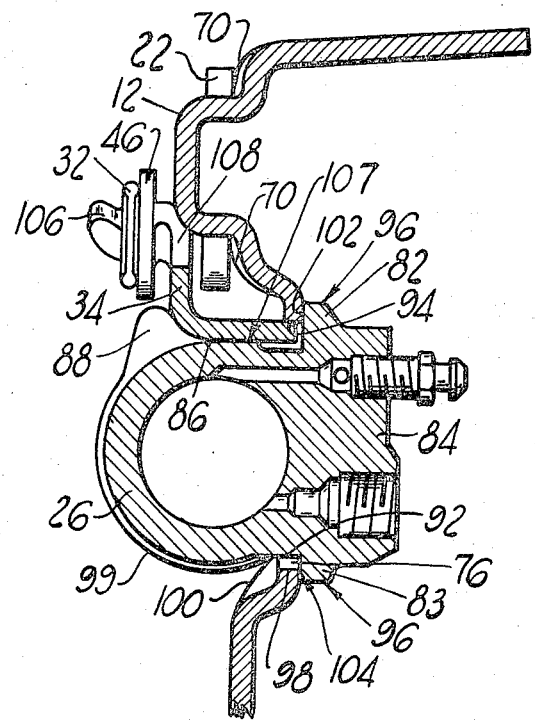
FIGURE 7 is a section view taken along line 7—7 of FIGURE 1 illustrating the wheel cylinder, backing plate connection.
Figure 6:
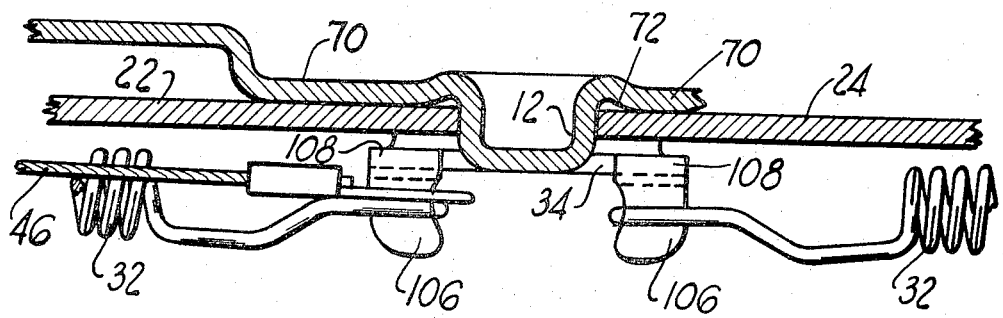
FIGURE 6 is a section view taken along line 6—6 of FIGURE 1.

Referring to FIGURES 7 and 7A, wheel cylinder 26 has flanges 82 and 83 integral therewith and integral with the inlet and bleeder boss 84. Lugs 82 and 83 extend laterally beyond the outer side periphery of the wheel cylinder 26. The wheel cylinder has a flat portion 86 on one side and two spaced integral bosses 88 extending laterally outwardly from the upper portion of the same side as the flat portion 86, and has integral projections 90 (see FIGURE 1) extending from the middle portion of the same side. The wheel cylinder is connected to the backing plate by first tilting the wheel cylinder toward the anchor 12 and inserting flange 82 into the slot 76, which is slightly wider than the width of the inlet boss 84, until surface 92 of the wheel cylinder bears against the upper edge 94 of the slot 76. Then, the lug 83 will fit into the slot with its surface 96 moving past the lower edge 98 of slot 76. The wheel cylinder is then moved downwardly with the boots 99 bearing on portions 100 of the depressed area 74. It will be noted that due to the slant of the depressed area 74, any downward motion of the wheel cylinder will result in the wheel cylinder camming forwardly on the depressed area and bringing lugs 82, 83 in contact with flat rear portions 102 and 104 of the backing plate and tends to interlockingly locate the wheel cylinder relative to the backing plate in both radial and axial directions. Locking plate 34 is inserted between the wheel cylinder and the upper edge 94 of slot 76 and has a portion 107 bearing against the flat surface 86 of the wheel cylinder. The locking plate has ears 106, one of which has a spring 32 and a cable 46 connected thereto and the other of which has a spring 32 connected thereto. While the springs 32 and cable 46 are shown connected to the ears 106 of the locking plate, the springs and cable may be attached to the locking plate by other means, such as, for example, the locking plate having openings therein for receiving the springs and cable. Springs 32 maintain a bias on the locking plate in a downward direction thereby urging the wheel cylinder 74 in a downward and forward direction and engaging the lugs 82, 83 with the rear portions 102, 104 of the backing plate. Lateral movement of the plate is limited by projections 90 (see FIGURE 1) of the wheel cylinder and axial movement of the locking plate is limited by the bosses 88 of the wheel cylinder. The locking plate may also serve another function, that of preventing excess axial movement of the shoe ends 22 and 24 away from the anchor by having laterally extending portions 108 overlying the shoe ends 22 and 24. Whether or not the locking plate has a portion extending over the shoe ends for preventing excess axial movement of the shoe ends depends on the type of brake assembly used. It will be noted that the slot 76 also serves to locate both the wheel cylinder and the locking plate 34 on the backing plate.

FIGURES 7B and 7C illustrate a modification of the wheel cylinder, backing plate connection of FIGURE 7 wherein a locking plate is not used. The wheel cylinder housing 27 has an inlet boss 85 with lugs 87 and 89 forming a groove 91 interlockingly receiving upper edge 94 of the slot 76. The wheel cylinder housing has ears 93 integral therewith for receiving the ends of spring 32 and the end of the automatic adjusting cable 46. Rib 97 is integral with the housing and extending over the shoe ends 22, 24 of the brake shoes for preventing excess axial movement of the ends 22, 24. For an added safety feature, the wheel cylinder housing 27 has a flange 101 integral therewith which bears against the depressed area 74. The backing plate has a grease baffle 103 having portion 105 extended to overlie the flange 101 to prevent axial movement of the wheel cylinder 27. A highly compressible sealing gasket 107 is provided between the wheel cylinder and backing plate for preventing water and dirt from entering the interior of the brake assembly.

While the embodiments disclosed illustrate the springs 32 attached to the brake shoes, they could be attached to any support which will serve to create a bias on the wheel cylinder. Furthermore, it is conceivable that if the bias on the wheel cylinder by springs is undesirable, the tighter interlocking connection between the wheel cylinder and backing plate could be effected, for instance by inserting a strip of material between the lugs 82, 83 and the backing plate surface 102 and between the lug 87 and the backing plate surface 102.

While the wheel cylinder, backing plate connections are shown in relation to a shoe web guided backing plate, the connection may be used with any type backing plate.

*Parking brake*

Figure 9:
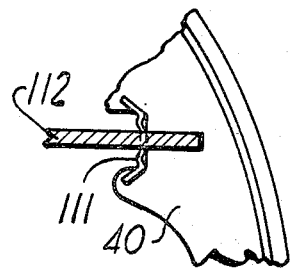
FIGURE 9 is a section view taken along line 9—9 of FIGURE 8.

Referring to FIGURES 8 and 9, the bell crank lever 36 extends through a slot 80 of the recess 78 and has a notch 110 formed therein at the front end 38 of the lever. The notch 110 of the bell crank lever receives the web 40 of the brake shoe. A strut 42 has one end 114 connected to the web 44 of the brake shoe and is inclined frontwardly to where its other end 116 is connected in front of the web 40 to end 38 of the bell crank lever 36. The rear end 118 of the bell crank lever has a cable 120 connected thereto, which cable leads to a parking brake lever or hand brake lever, not shown. A rubber shield 122 is located interiorly of the backing plate to keep dirt from entering the brake assembly through the slot 80. The shield fits snugly over the end of the lever 38. Upon pulling the cable 120, the bell crank lever 36 will wedge the two brake webs 40 and 44 apart through the notched portion 110 and strut 42 with a force component tending to urge each shoe toward the backing plate. Spring 124 is connected to link 42 at end 114 and serves to hold the link in place with relation to the web 44 and also serves to prevent rattling of the link 42. Spring 111 is inserted between end 38 of lever 36 and web 40 of the brake shoe to hold the lever 36 in place and prevent rattling thereof.

FIGURE 10 illustrates a different embodiment of the invention where the backing plate is secured to a spindle at the anchor. The integral anchor 212 has a hole 214 therein receiving bolt 216 which secures the backing plate to the spindle 218.

Although this invention has been illustrated in connection with specific embodiments, numerous other inventions and adaptations of the invention will be apparent to those skilled in the art. I intend to include in the scope of the following claims all equivalent applications of the invention whereby the same or substantially the same results may be obtained.

I claim:

1. A backing plate for a brake assembly including brake shoes arranged in end-to-end relationship, said backing plate having portions raised axially relative to its outer periphery and spaced therefrom for supporting brake shoes by their webs, the axial depth of the raised portions above the outer peripheral portion being greater than half the width of the said brake shoes, and an integral anchor projection intermediately located with respect to one of said raised portions so as to be between the ends of said brake shoes, said integral anchor projection extending axially substantially above all said raised portions.

2. The structure as recited in claim 1 wherein said projection is hollow and integral with said one of the raised portions.

3. The structure as recited in claim 1 wherein said projection is an anchor pin mounted in an opening in said one raised portion.

4. In a drum brake assembly comprising: a backing plate, a pair of brake shoes arranged in end to end relationship on said backing plate each comprising an arcuate rim and a transverse web, said backing plate comprising an integral portion raised axially relative to its outer periphery and spaced therefrom and an annular anchor boss integral with said raised portion and extending axially therefrom, said anchor being located between one pair of adjacent ends of said brake shoes, said raised portion including a shoe supporting portion on each side of said anchor slidably engaged by a respective web of each shoe, said anchor being separated from each shoe supporting portion by a depression which is of a depth of less than the thickness of the backing plate.

5. The structure as recited in claim 4 further comprising a plug arranged within said anchor boss and engaging the wall thereof to provide additional support thereto.

6. The structure as recited in claim 5 wherein an opening is provided in said anchor boss, and an end for said plug extending axially through said opening.

References Cited

UNITED STATES PATENTS

| | | | |
|---|---|---|---|
| 1,860,959 | 5/1932 | Schnell. | |
| 2,051,916 | 8/1936 | Taylor | 188—78 X |
| 2,089,508 | 8/1937 | Sneed | 188—206 |
| 2,168,700 | 8/1939 | Burnett | 188—78 |
| 2,912,068 | 11/1959 | House | 188—78 |
| 2,942,696 | 6/1960 | House | 188—78 |

FOREIGN PATENTS 546,725  9/1957  Canada.

MILTON BUCHLER, *Primary Examiner.*

B. S. MOWRY, T. W. BUCKMAN, *Assistant Examiners.*